Jan. 18, 1938.  D. HERING ET AL  2,105,650
CORE ORIENTATION APPARATUS
Filed July 14, 1937   2 Sheets-Sheet 1
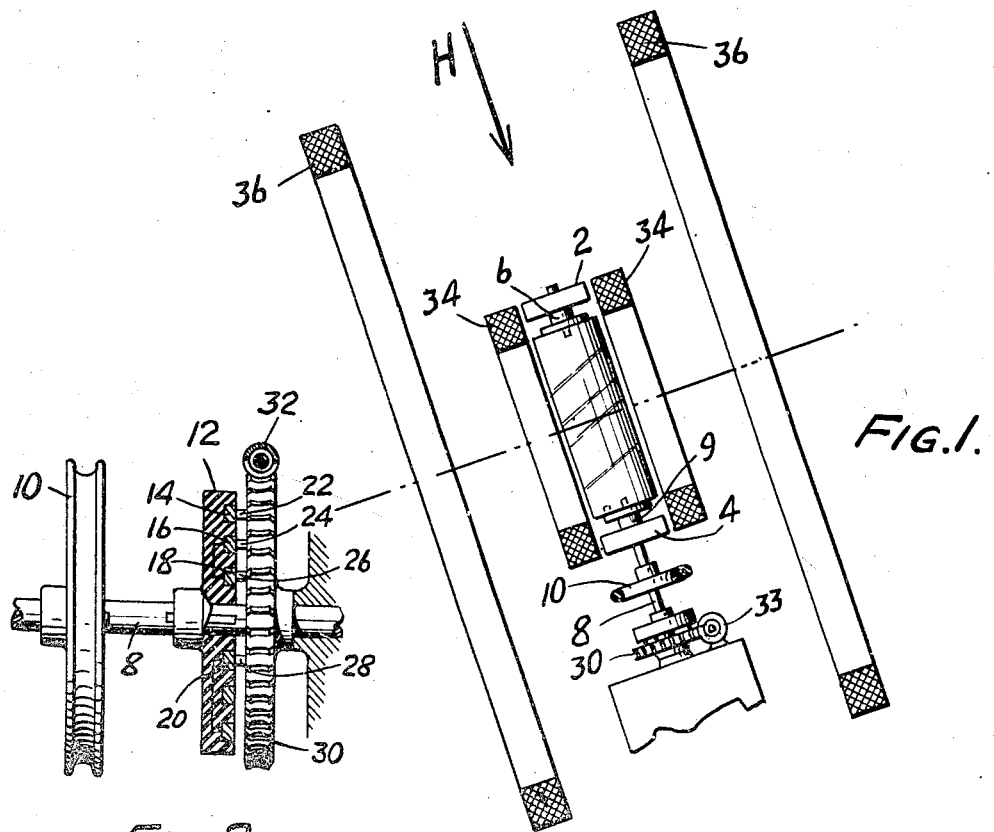
FIG.1.
FIG.2.
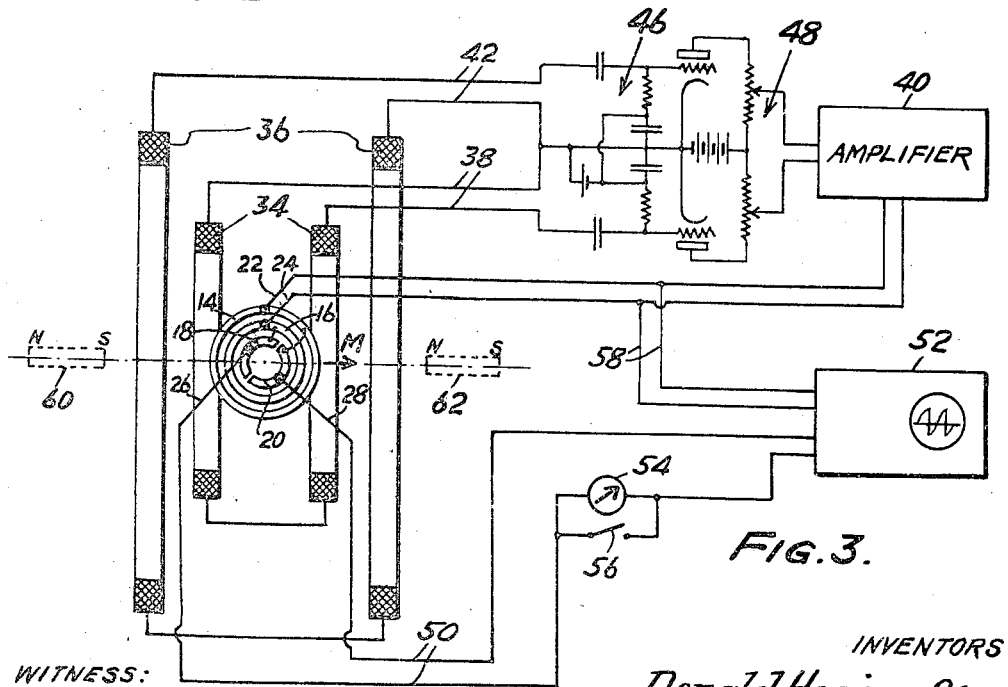
FIG.3.
WITNESS:
Robt R Mitchel
INVENTORS
Donald Hering &
Clay H. Beattie, Jr.
BY
ATTORNEYS Patented Jan. 18, 1938

2,105,650

UNITED STATES PATENT OFFICE 2,105,650

CORE ORIENTATION APPARATUS

Donald Hering, South Gate, and Clay H. Beattie, Jr., Covina, Calif., assignors to Sperry-Sun Well Surveying Company, Philadelphia, Pa., a corporation of Delaware Application July 14, 1937, Serial No. 153,528

11 Claims. (Cl. 175—182)

This invention relates to a method and apparatus for determining the magnetic properties of cores taken from bore holes.

As described, for example, in Herrick Patent 1,792,391, dated February 17, 1931, it is possible to determine to a fair degree of accuracy the dip and strike of strata penetrated by a bore hole if measurements are made to ascertain the magnetic polarization of a core taken at the location of the strata. In making such determinations the magnetic polarity of the core must be determined as, for example, by a magnetometer such as that disclosed in said Herrick patent, and the magnetic north of the core indicated thereon. By suitable measurements there can then be determined the apparent dip and strike of a bedding plane appearing in the core with respect to the magnetic north so indicated.

The magnetic polarization of such cores, however, is extremely weak, the field strength generally being of the order of 1 to 2 x $10^{-5}$ gauss, with a maximum of about 5 or 6 x $10^{-5}$ gauss. Since the horizontal intensity of the earth's magnetic field is in general of the order of 0.2 gauss, it will be obvious that considerable difficulty is experienced in the commercial measurement of the polarization of cores. This can be accomplished as disclosed in the Herrick patent by the use of a carefully shielded magnetometer.

It sometimes happens that a core taken from a bore hole may not exhibit any measurable polarization, but will show anisotropic susceptibility. It has been found that in such cases it may generally be validly deduced that the original position of the core in the earth was such that its axis of maximum susceptibility coincided with the direction of the magnetic field of the earth. The measurement of the susceptibility of a core is somewhat similar to that of measurement of its polarization, inasmuch as in a magnetometer the indicating magnetic needle will respond to alignment with the axis of maximum susceptibility. However, as will be readily understood, the resulting attraction will not exhibit polarity and in a sense there will be a double attraction in a single revolution of the core rather than the attraction and repulsion characteristic of polarization. In other cases both polarization and anisotropic susceptibility may occur with corresponding effects on the magnetometer.

It is the object of the present invention to provide a method and apparatus for determining the polarization or susceptibility, or both, of cores in such fashion as to eliminate as far as possible any effects of the constant earth's magnetic field or variable or constant stray magnetic fields due to either artificial or natural sources. In accordance with the invention minute variations in a magnetic field surrounding a rotating core are caused to induce electromotive forces in an adjacent coil, which electromotive forces are subjected to amplification to produce measurable currents or voltages which may then be used to determine the magnetic characteristics of the core.

The above object of the invention, and subsidiary objects relating to details of both method and apparatus, will become apparent from the following description read in conjunction with the accompanying drawings, in which:

Figure 1 is a vertical section taken through a preferred apparatus for carrying out the invention;

Figure 2 is an enlarged axial section showing certain commutator details;

Figure 3 is a wiring diagram showing the various electrical connections involved in carrying out the invention.

Figure 4:
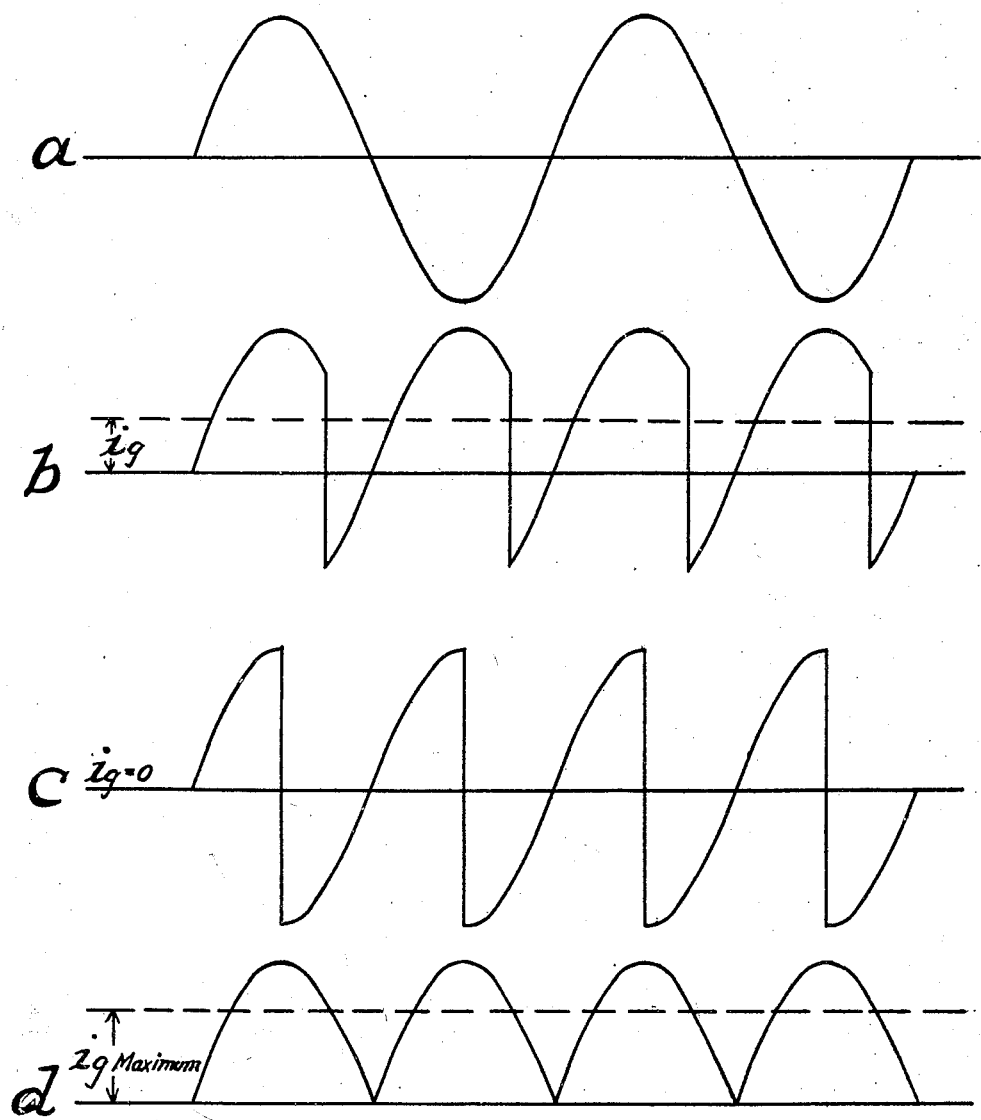
Figure 4 is a diagram illustrating the adjustments necessary for the making of a determination of the axis of polarization.

Referring first to Figure 1, there are illustrated therein supporting members 2 and 4, the former of which serves for the mounting of a short shaft carrying a core engaging member 6, while the latter supports a shaft 8 carrying a core engaging member 9. The two shafts are lined up and the members 6 and 9 are provided with suitable pins for engaging the core so as to mount it for rotation about its axis. The shaft 8 is driven from a suitable motor or the like not shown, by means of a belt trained over a pulley 10, or by some other suitable transmission.

Preliminary preparation is necessary for a core the magnetic properties of which are to be determined. Such preparation in general involves the turning down of the core to remove from its exterior sufficient of its material to insure that it does not carry any contaminating magnetic materials such, for example, as chippings from a drill or the like. The core, after such turning, is carefully handled to avoid contamination with magnetic materials and may be mounted directly for rotation if sufficiently hard to be self-supporting, or it may be encased within a suitable non-magnetic cylinder if it is so soft as to be possibly damaged by the high speed rotation to which it will be subjected in the apparatus. Brass cylinders are suitable for this purpose if polarization is being determined; but if anisotropic susceptibility is being determined, a cylinder of insulating material such as bakelite or hard rubber should be used, as a conductive cylinder will have induced in it eddy currents which will affect the determination.

The shaft 8 has mounted thereon a disc 12 of insulating material in which are located two concentric slip rings 14 and 16 and two commutator segments 18 and 20, which are, respectively, connected to the slip rings 16 and 14. If anisotropic susceptibility is being determined four, instead of two commutator segments, alternately connected to the pair of slip rings, are necessary, as will be obvious hereafter. Bearing on the slip rings 14 and 16 are brushes 22 and 24, while bearing on the commutator segments are brushes 26 and 28, all of these brushes being carried by an insulated worm wheel 30 and connected by suitable flexible wires to other portions of the apparatus as described hereafter. The worm wheel 30 never need turn through more than a revolution and consequently flexible connections may be readily provided. The worm wheel 30 is journalled upon the shaft 8 and is adapted to be angularly adjusted by a worm 32 to which is connected a knob 33, the worm being suitably mounted in a fixed portion of the supporting frame.

A pair of coils 34 are arranged co-axially on opposite sides of the mounted core, as indicated in Figure 1. These coils are preferably circular in form with their axis perpendicular to the axis of rotation of the core. The coils are also preferably of the Helmholtz type, i. e., spaced from each other a distance substantially equal to their mean radius. Such coils, as is well known, have a characteristic that a current through them will produce a substantially uniform field between them and have also the converse property that a maximum voltage will be induced in them by a magnetic field rotating about an axis transverse to the direction of the field and perpendicular to their common axis.

A second set of Helmholtz coils 36 is provided, as indicated in Figure 1, of considerably larger size than the coils 34, so that any magnetic flux through the coils 34 due to any moderately remote outside source will substantially identically affect the coils 36, although the varying flux due to the polarization or anisotropic susceptibility of a rotating core will affect the outer coils much less than the inner ones.

In order to minimize as far as possible the effects of susceptibility of a rotating core due to stray fields, so that the effects of susceptibility will not substantially interfere with the observation of the effects of polarization of the core, the magnetic field of the earth should extend substantially in the direction of the axis of rotation. The magnetic field of the earth is, of course, generally not horizontal. It is indicated at H in Figure 1, and would require that the entire apparatus be tilted so that the axis of the core would extend in the direction of the magnetic vector. Additionally, of course, it may be desirable to shield the apparatus, though if the arrangement illustrated in Figure 1 is adopted, containing the outside Helmholtz coils 36, stray varying magnetic fields due to commercial alternating current lines will be balanced out and their effects may be made substantially negligible.

The various parts of the apparatus are wired as indicated in Figure 3. The coils 34 and 36 are, respectively, connected as indicated at 38 and 42 to an amplifier 40 the first stage of which is indicated separately since it must be of a somewhat unusual type, namely, of a balanced push-pull type with the same very high input impedance for both coils 38 and 42, which preferably should have the same inductance. The input circuit is indicated at 46, while the output from the first stage, connected to the second stage of the amplifier, is indicated at 48 as comprising two voltage dividers provided with adjustable contacts so as to balance the effective outputs of the two tubes which are individually associated with the two coils. Such arrangement could not be provided in the input to the first stage because of the effect of a variable resistance on the impedance of the coil circuits, which would result in changing their phase characteristics so that balance of one against the other could not be effected. The balance desired is, of course, such that external sources will produce similar effects in both coils and, by reason of the balanced arrangement, such effects will be neutralized at the input to the second amplification stage. The potentiometers 48 will take care of any difference in pick-up of the two coils. The different impedances in the plate circuits will have no effect on the coil circuit impedances provided a negative bias is provided for the tube grids. The input impedances of the first tubes should, of course, be very high. The subsequent stages of the amplifier are preferably of a push-pull nature, desirably with resistance coupling to avoid the picking up of stray fields. It will be obvious, of course, that the amplifier must have a very high gain. As indicated above, the field strengths of the cores are very small and will produce in the amplifier effects only comparable with those which would constitute ordinary background effects. Consequently, the amplifier must be a carefully constructed one of the type used for detection and measurement of very small inputs.

The output of the amplifier is fed to the brushes 22 and 24 and thence through the slip rings to the commutator segments 18 and 20. The brushes 26 and 28 bearing on these commutator segments are connected through the lines 50 to an oscilloscope, indicated at 52, provided with the conventional sweep circuit and other controlling apparatus. In order to provide a stationary pattern, it is preferable to introduce into the sweep circuit control voltage from the periodic output of the amplifier. This is indicated by the lines 58.

A galvanometer 54 is connected in one of the lines 50, and may be shunted out by a switch 56 during adjustments.

A pair of bar magnets 60 and 62 may be introduced when susceptibility measurements are being made. These bar magnets are removed during attempts to measure polarization.

Assuming first that a polarized core is in the apparatus and that the apparatus has been adjusted for balance to eliminate the effects of outside fields, with proper angular adjustment to eliminate or make a minimum the effect of the earth's magnetic field, the core will be rotated at high speed and, with the switch 56 closed to shut out the sensitive galvanometer 54, the pattern produced on the oscilloscope screen will be observed.

The curve indicated at $a$ in Figure 4 will represent the voltage induced in the coil 34. At the same time, there will, of course, be produced a corresponding voltage in the outer coil 36. However, because of the remoteness of the outer coil from the core, the voltage produced will be considerably less than that induced in the inner one, and despite the balance of the amplifier against stray inputs there will be a substantial alternating voltage produced at the input of the second stage of the amplifier. The amplifier will accordingly have an output corresponding in wave form to the input. The phase of the output will be definitely related to the phase of rotation of the core, though the phases may be somewhat displaced due to changes of phase occurring in the amplifier. This displacement may be experimentally measured and regarded as a constant of the apparatus. Assuming, however, for simplicity, that there is no phase shift in the amplifier, the following adjustments will be made. In actual practice, similar adjustments will be made, taking into account, however, any phase shift which actually exists.

The pattern that may be expected on the oscilloscope before adjustment may resemble that indicated at $b$ in Figure 4; in other words, at two points in each period, located one hundred eighty electrical degrees apart, commutation will take place resulting in an inversion of the voltage input to the oscilloscope. At such time, if the switch 56 were opened, the galvanometer would indicate a value such as $i_g$, representing the rectified component of the output of the commutator. Desirably, however, during such preliminary adjustments the galvanometer should be out of the circuit inasmuch as it should be a very sensitive one and the rectified current might be of quite substantial amount.

Adjustment of the worm wheel 30 is now made to shift the brushes 26 and 28. Such shifting is carried out until it appears from the oscilloscope screen that the rectification is taking place at the maximum of the current waves, as indicated at $c$ in Figure 4. When this condition is attained, as visibly indicated by the oscilloscope, it will be clear that the direct component of the current must be small. Consequently, the switch 56 is opened and the galvanometer indication noted. In general, since the oscilloscope will not be extremely accurate, there will be some residual current flowing through the galvanometer. Further adjustment of the brushes is then made until the galvanometer current is zero. When this adjustment occurs, it will be obvious that there is a definite angular relationship between the brushes, the commutator segments and the radial component of the axis of polarization of the core. Such relationship is indicated, for example, in Figure 3, in which the arrow M indicates the radial component of the polarization vector of the core. The condition just described will be obtained when, if the radial component of the polarization vector extends in the direction of the axis of the coil 34, the brushes will be ninety degrees removed from the breaks between the commutator segments. Consequently, by turning the core and commutator to such position that the brushes are so lined up with respect to the commutator segments, it will be known that the radial component of the polarization vector will lie along the axis of the coil. The polarity of the vector is determined from the pattern on the oscilloscope knowing the polarities of the deflecting plates. The apparatus may be set up so that the pattern shown at $c$ in Figure 4 will indicate a north pole to the right, while a mirror image of that pattern would indicate a north pole to the left. It will be noted that the pattern indicated at $c$ is not symmetrical with respect to any vertical axis.

It will be obvious, of course, that the determination of the direction of the magnetic vector of the core will be facilitated by providing suitable scales and markings on the commutator carrying member 12 and the brush carrying member 30. Such scales have not been illustrated in the diagrams here shown.

Instead of using the galvanometer as indicated above, the oscilloscope alone may be made to serve as a quite sensitive indicator of some definite alignment of the vector, commutator segments and brushes. This may be accomplished by an adjustment of the brushes to secure a pattern such as indicated at $d$, which indicates that rectification is occurring whenever the wave shown at $a$ crosses the axis. As is indicated, such rectification would correspond to a maximum value for the current. However, a maximum value is difficult to read on an instrument, and the galvanometer or equivalent instrument is of little use in this case. The oscilloscope pattern corresponding to such complete rectification, however, is quite characteristic, particularly when connections are so made that there will be periodically indicated on the oscilloscope the zero axis to serve as a reference indicative of the failure of the current to drop below it. If such axis is shown on the oscilloscope adjustment will be made until no projections appear below it.

Assuming now that the core shows anisotropic susceptibility only, it will be obvious that similar considerations will apply if a substantially uniform field is provided through the core, as, for example, by a pair of bar magnets such as indicated at 60 and 62, and if a four segment commutator is used, since the frequency of the oscilloscope pattern will be doubled for the same speed of rotation of the core. Adjustments, however, may be carried out along lines obvious from the above to determine the axis of maximum susceptibility.

In a core showing both polarization and anisotropic susceptibility, a combination of these effects will result if an artificial field be provided, as by the use of magnets such as 60 and 62. Under such conditions, the effects of polarization and anisotropic susceptibility may be readily segregated by the selective use of commutators having two and four segments. If a two-segment commutator is used, then the double frequency component of the induced voltage due to anisotropic susceptibility will not be rectified irrespective of the angular relationship between the brushes, the core, and the segments. While a distortion of the oscilloscope pattern will appear due to the anisotropic susceptibility, nevertheless a zero indication of the galvanometer will correspond to the previously discussed adjustment condition indicated at $c$ in Figure 4 for the polarization of the core. Conversely, if the four-segment commutator is used, rectification of the fundamental frequency component will not take place and an adjustment for zero current through the galvanometer will indicate a predetermined relationship between the axis of maximum susceptibility, the brushes and the segments. In both of these cases, the oscilloscope may give peculiar figures which, however, may be used to approximate the zero current condition through the galvanometer before placing the galvanometer in the circuit. Where both polarization and anisotropic susceptibility are to be determined, both two and four segment commutators may be carried by the same insulated carrier 12. The same pair of slip rings may, of course, be used for both arrangements, suitable switches being provided to switch into the circuit either the brushes corresponding to the two-segment commutator or those corresponding to the four-segment commutator.

Consideration must be given to the possibility of anisotropic conductivity of the core in making determinations of anisotropic susceptibility. Under certain conditions, a core may contain layers of rock and materials of substantially different conductivities, and the arrangement of the layers may be such as to produce results, when the core is rotated in a magnetic field, which may be confused with results due to anisotropic susceptibility. However, arrangements of rock materials which would produce this effect will be readily observable in the core and will indicate whether or not the results obtained in the apparatus could be validly contributed to anisotropic susceptibility. No interference with determinations of polarization, however, will result due to anisotropic conductivity.

It will be clear that numerous variations in the measuring apparatus, balance apparatus, etc., may be made in accordance with the present invention and without departing from the principles thereof.

What we claim and desire to protect by Letters Patent is:

1. The method of determining magnetic anisotropy of a core taken from a bore hole comprising rotating the core in proximity to a pick-up coil to produce a varying flux therein, and providing indications of the phase relationship of the voltage induced in the coil to the angular position of the core.

2. The method of determining magnetic anisotropy of a core taken from a bore hole comprising rotating the core in proximity to a pick-up coil to produce a varying flux therein, amplifying the voltage induced in the coil, commutating the output of said amplification in determinable phase relationship with the rotation of the core, and providing indications of the result of such commutation to thereby determine the magnetic anisotropy of the core.

3. The method of determining magnetic anisotropy of a core taken from a bore hole comprising rotating the core in proximity to a pick-up coil to produce a varying flux therein, amplifying the voltage induced in the coil, commutating the output of said amplification in determinable phase relationship with the rotation of the core, and adjusting the said phase relationship of commutation to obtain a predetermined result of commutation.

4. The method of determining magnetic anisotropy of a core taken from a bore hole comprising rotating the core in proximity to a pick-up coil to produce a varying flux therein, amplifying the voltage induced in the coil, commutating the output of said amplification in determinable phase relationship with the rotation of the core, and adjusting the said phase relationship of commutation to obtain a zero direct component of the commutated output.

5. The method of determining magnetic anisotropy of a core taken from a bore hole comprising rotating the core in proximity to a pick-up coil to produce a varying flux therein, amplifying the voltage induced in the coil, commutating the output of said amplification in determinable phase relationship with the rotation of the core, and adjusting the said phase relationship of commutation to obtain a maximum direct component of the commutated output.

6. Apparatus for the determination of the magnetic anisotropy of cores comprising a pick-up coil, means for mounting a core for rotation in proximity to said coil to induce a voltage therein, and means for indicating the phase relationship of the voltage induced in the coil to the angular position of the core.

7. Apparatus for the determination of the magnetic anisotropy of cores comprising a pick-up coil, means for mounting a core for rotation in proximity to said coil to induce a voltage therein, means for commutating said voltage in determinable phase relationship with the rotation of the core, and means for indicating the results of such commutation.

8. Apparatus for the determination of the magnetic anisotropy of cores comprising a pick-up coil, means for mounting a core for rotation in proximity to said coil to induce a voltage therein, means for amplifying and commutating said voltage in determinable phase relationship with the rotation of the core, and means for indicating the results of such commutation.

9. Apparatus for the determination of the magnetic anisotropy of cores comprising a pick-up coil, means for mounting a core for rotation in proximity to said coil to induce a voltage therein, means for communicating said voltage in determinable phase relationship with the rotation of the core, means for adjusting said phase relationship, and means for indicating the results of such commutation.

10. Apparatus for the determination of the magnetic anisotropy of cores comprising a pickup coil, means for mounting a core for rotation in proximity to said coil to induce a voltage therein, means for amplifying and commutating said voltage in determinable phase relationship with the rotation of the core, means for adjusting, and means for indicating the results of such commutation.

11. Apparatus for the determination of the magnetic anisotropy of cores comprising a pickup coil, means for mounting a core for rotation in proximity to said coil to induce a voltage therein, means for indicating the phase relationship of the voltage induced in the coil to the angular position of the core, a second coil arranged to respond to outside disturbances to a degree corresponding to the response of the first named coil thereto but not to respond to the rotation of the core to the same extent as the first named coil, and means for balancing against each other the responses of both coils to outside disturbances.

DONALD HERING.
CLAY H. BEATTIE, JR.

CERTIFICATE OF CORRECTION.

Patent No. 2,105,650. January 18, 1938.

DONALD HERING, ET AL.

It is hereby certified that error appears in the printed specification of the above numbered patent requiring correction as follows: Page 4, second column, line 36, claim 9, for the word "communicating" read commutating; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.